(12) United States Patent
Wang et al.

(10) Patent No.: US 10,880,514 B2
(45) Date of Patent: Dec. 29, 2020

(54) METHOD AND TV SET FOR TRANSMITTING IMAGE DATA

(71) Applicant: HISENSE VISUAL TECHNOLOGY CO., LTD., Shandong (CN)

(72) Inventors: Junsong Wang, Shandong (CN); Zhikui Wang, Shandong (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 16/585,324

(22) Filed: Sep. 27, 2019

(65) Prior Publication Data
US 2020/0169692 A1 May 28, 2020

Related U.S. Application Data

(63) Continuation of application No. PCT/CN2019/104970, filed on Sep. 9, 2019.

(30) Foreign Application Priority Data

Nov. 27, 2018 (CN) .......................... 2018 1 1423568

(51) Int. Cl.
*H04N 7/01* (2006.01)
*H04N 5/38* (2006.01)
(Continued)

(52) U.S. Cl.
CPC ........... *H04N 7/0127* (2013.01); *H04N 5/145* (2013.01); *H04N 5/38* (2013.01); *H04N 21/47* (2013.01)

(58) Field of Classification Search
CPC ...... H04N 7/0127; H04N 7/013; H04N 5/145; H04N 5/38; H04N 5/445; H04N 5/44543
See application file for complete search history.

(56) References Cited

U.S. PATENT DOCUMENTS

| | | | |
|---|---|---|---|
| 2009/0059068 A1* | 3/2009 | Hanaoka | H04N 7/013 348/459 |
| 2012/0014080 A1* | 1/2012 | Feng | G06F 30/392 361/784 |
| 2015/0071357 A1 | 3/2015 | Pang et al. | |

FOREIGN PATENT DOCUMENTS

| | | |
|---|---|---|
| CN | 101778277 A | 7/2010 |
| CN | 102186035 A | 9/2011 |

(Continued)

OTHER PUBLICATIONS

First Office Action for corresponding Chinese Appl. No. 201811423568.9 dated Mar. 25, 2020 with English translation, 17 pages.

(Continued)

*Primary Examiner* — Samira Monshi
(74) *Attorney, Agent, or Firm* — Brinks Gilson & Lione

(57) ABSTRACT

The disclosure discloses a method for transmitting image data and an intelligent TV set. The method includes transmitting, by a primary chip, image data to a second chip. The image data comprises pixel data including a pixel type for indicating that a pixel in the image to be displayed is a menu On-Screen Display (OSD) pixel or a video pixel. The method includes receiving, by the second chip, the image data, and determining the pixel type in the image data. The method further includes performing, by the second chip, a Motion Estimate and Motion Compensation (MEMC) function on the pixel in response to the pixel type being the video pixel, and not performing the MEMC function on the pixel in response to the pixel type of the pixel being the menu OSD pixel.

7 Claims, 6 Drawing Sheets

(51) Int. Cl.
*H04N 5/14* (2006.01)
*H04N 21/47* (2011.01)

(56) References Cited

FOREIGN PATENT DOCUMENTS

| | | |
|---|---|---|
| CN | 105306866 A | 2/2016 |
| CN | 105872419 A | 8/2016 |
| CN | 205510317 U | 8/2016 |
| CN | 109218647 A | 1/2019 |
| KR | 20090090796 A | 8/2009 |

OTHER PUBLICATIONS

International Search Report for PCT/CN2019/104970, dated Nov. 28, 2019, 7 pages, Chinese language with English translation.

* cited by examiner

METHOD AND TV SET FOR TRANSMITTING IMAGE DATA

RELATED APPLICATIONS

This application is a continuation of International Application No. PCT/CN2019/104970 filed on Sep. 9, 2019, which claims the benefits of Chinese Patent Application No. 201811423568.9, filed with the Chinese Patent Office on Nov. 27, 2018, both of which are incorporated herein by reference in their entireties.

FIELD

The present disclosure relates to intelligent TV sets, and particularly to a method for transmitting image data, and an intelligent TV set.

BACKGROUND

At present, a Frame Rate Conversion (FRC) chip can enable or disable a Motion Estimation and Motion Compensation (MEMC) function for an image as a whole.

SUMMARY

Embodiments of the disclosure provide a method for transmitting image data, and an intelligent TV set.

Embodiments of the disclosure provide a method for transmitting image data of an intelligent TV set. The method includes transmitting, by a primary chip, image data to a second chip. The image data is associated with an image to be displayed and transmitted. The image data comprises pixel data associated with the image to be displayed, and the pixel data comprises information of a pixel type for indicating that a pixel in the image to be displayed is a menu On-Screen Display (OSD) pixel or a video pixel. The method includes receiving, by the second chip, the image data, and determining the pixel type of the pixel in the image data. The method further includes performing, by the second chip, a Motion Estimate and Motion Compensation (MEMC) function on the pixel in the image to be displayed in response to the pixel type of the pixel being the video pixel, and not performing the MEMC function on the pixel in the image to be displayed in response to the pixel type of the pixel being the menu OSD pixel.

Embodiments of the disclosure provide an intelligent TV set. The TV set includes a display screen configured to display an image; and a memory configured to store instructions and data associated with the display screen. The TV set also includes a first chip comprising a first processor in communication with the memory; and a second chip comprising a second processor in communication with the first chip. When the first processor executes the instructions, the first processor is configured to cause the first chip to transmit image data to the second chip. The image data is associated with an image to be displayed and transmitted, the image data comprises pixel data associated with the image to be displayed, and the pixel data comprises information of a pixel type for indicating a pixel in the image to be displayed is a menu On-Screen Display (OSD) pixel or a video pixel. When the second processor executes the instructions, the second processor is configured to cause the second chip to receive the image data and determine the pixel type of the pixel in the image data. When the second processor executes the instructions, the second processor is further configured to cause the second chip to perform a Motion Estimate and Motion Compensation (MEMC) function on the pixel in the image to be displayed in response to the pixel type of the pixel being the video pixel, and not perform the MEMC function on the pixel in the image to be displayed in response to the pixel type of the pixel being the menu OSD pixel.

BRIEF DESCRIPTION OF THE DRAWINGS

In order to make the embodiments of the disclosure more apparent, the drawings to which reference is to be made in the description of the embodiments will be introduced below in brevity, and apparently the embodiments to be described below are only some embodiments of the disclosure. Those ordinarily skilled in the art can further derive the other drawings from these drawings without any inventive effort.

DETAILED DESCRIPTION OF THE EMBODIMENTS

Figure 1:
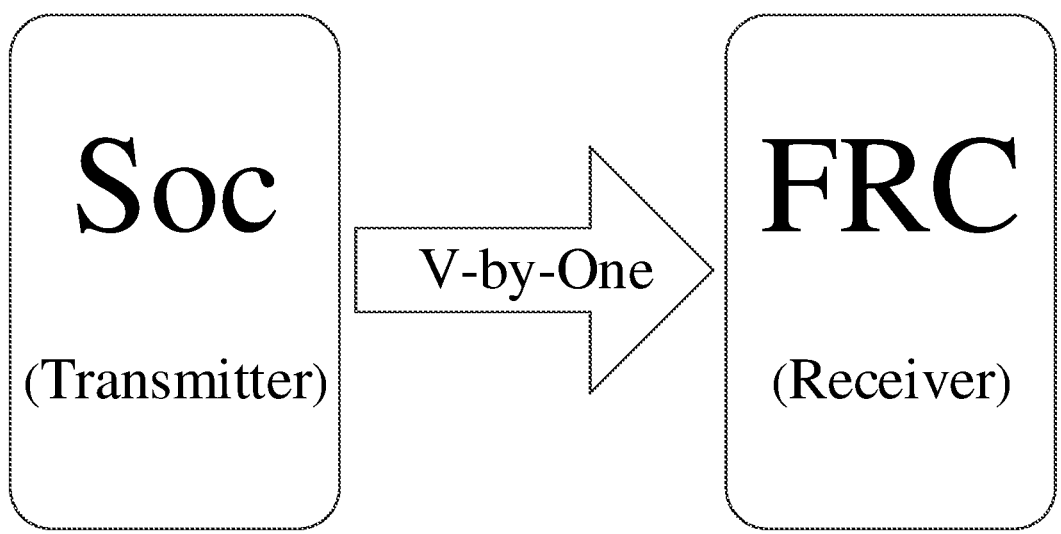
FIG. 1 is a schematic structural diagram of a system according to some embodiments of the disclosure.

The embodiments of the disclosure will be described below clearly and fully with reference to the drawings in the embodiments of the disclosure. Apparently the embodiments to be described are only a part but not all of the embodiments of the disclosure. Based upon the embodiments here of the disclosure, all of other embodiments those ordinarily skilled in the art can think of without any inventive effort shall come into the claimed scope of the disclosure.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The respective embodiments of the disclosure will be described below in details with reference to the drawings taking an intelligent TV set as an example. It shall be noted that the order in which the embodiments of the disclosure are presented only represents their order in the description of the present disclosure, but shall not suggest any superiority or inferiority of one embodiment to another.

It shall be noted that video data are typically external video data received via an input interface of the intelligent TV set, and OSD (On-Screen Display) data is typically menu data related to setting or displaying parameters for processing and displaying of an image displayed on a display screen of the intelligent TV set. While the video data are being displayed, the MEMC function is performed thereon to thereby eliminate motion-incurred dithering, motion-incurred blurring, etc., while an image is being displayed. While the menu data is being displayed, it is a still image, so the MEMC function will not be performed thereon.

The principle of the MEMC function lies in that a compensation frame is interposed between two adjacent traditional frames of images, where the interposed compensation frame is generally such a transition image between two or more adjacent frames of images, which is generated by processing the two or more frames of images. The transition image is interposed as such between the two adjacent traditional frames of images so that the motion images can be presented with a more smooth visual effect, and the trajectory of a moving object in the display screen can be more natural. Accordingly the video data is typically presented as dynamic images, and the MEMC function is performed thereon to thereby eliminate motion-incurred dithering, motion-incurred blurring, etc., while the images are being displayed; and since there is no moving object for image data displayed as a still image, e.g., the menu OSD data, so the MEMC function will not be performed.

When a preceding image of the intelligent TV set includes OSD data and video data, for example, a volume bar menu is displayed on a frame of video data being played, if the MEMC function is performed on the data of the entire image, the screen will appear fragments in the area of the volume bar menu because the volume bar menu is displayed as a still image; and if the MEMC function is disabled for the data of the entire image, there will be a poor display effect of a video image because the video image is displayed as a dynamic image, but the MEMC function is not performed thereon.

As the technologies are advancing, an FRC chip can enable or disable the MEMC function for a part of pixels in an image so that the MEMC function can be performed selectively on an image data including OSD data and video data, so it is desirable to provide a method for instructing the FRC chip to decide whether to perform the MEMC function on a pixel area in the image.

Embodiments of the disclosure provide a method for transmitting image data of an intelligent TV set so as to enable an FRC chip of a receiver to identify pixels as pixels in an OSD or video area, and to enable or disable the MEMC function for the different types of pixels in the image to thereby provide a better MEMC effect, improve the quality of the image and the quality of a product, and improve the experience and satisfaction of a user.

In the intelligent TV set, an SOC chip transmits audio and video data to the FRC chip according to the V-by-One protocol in a larger bandwidth and at a higher transmission speed, where all the pixel data in a frame of signal is transmitted according to the protocol instead of dividing the frame of signal into different areas for transmitting.

Embodiments of the disclosure provide a method for transmitting image data. The method is generally applied to an intelligent TV set. The function of a spare bit (i.e., the $24^{th}$ bit or $25^{th}$ bit) in color data in the V-by-One protocol is redefined to indicate whether data transmitted by a System On Chip (SOC) is menu On-Screen Display (OSD) data or video data, so that an FRC chip of a receiver can parse the spare bit (a flag bit), to thereby determine whether the OSD data is in the received data or not, and enable or disable the MEMC function according to a determination result.

The $24^{th}$ bit in the color data in the V-by-One protocol is defined as 3DLR, and the $25^{th}$ bit in the color data is defined as 3DEN, where 3DLR identifies a 3D left or right frame of signal, and 3DEN indicates whether the signals include 3D data. In one implementation when the signal is a 2D signal, these two spare bits are reserved bits, and the functions of these two spare bits are redefined in the embodiments of the disclosure to indicate whether pixels in an image are menu OSD or video pixels. In another implementation when the signal is a 3D signal, a General Purpose Input-Output (GPIO) port is used to distinguish 3DEN and 3DLR without using these two bits, so these two bits can be used to indicate whether pixels in an image are the menu OSD or the video pixels.

FIG. 1 is a schematic structural diagram of a system according to embodiments of the disclosure. A primary chip is configured to output OSD and video data (e.g. mixed OSD and video data), to package the data according to the V-by-One protocol, and to transmit the data to a second chip of a receiver. In one implementation, the primary chip may include a SOC. In another implementation, the second chip may include a FRC chip. Audio and video data are packaged according to the V-by-One protocol and transmitted in a larger bandwidth at a high speed.

Figure 2:
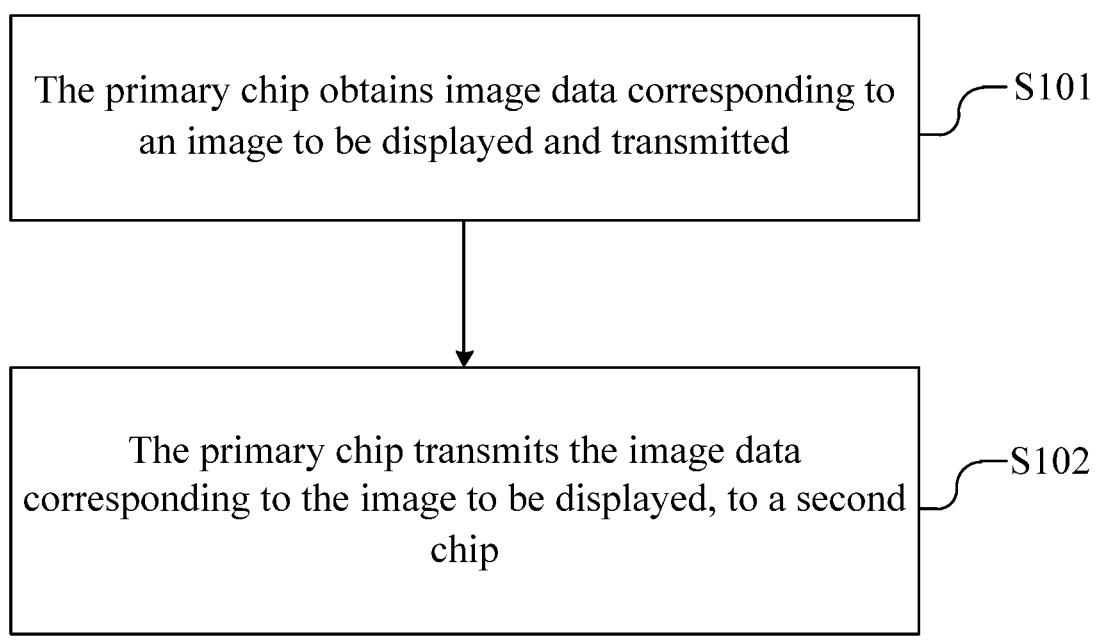
FIG. 2 is a flow chart of a method for transmitting image data according to some embodiments of the disclosure.

FIG. 2 is a flow chart of a method for transmitting image data according to embodiments of the disclosure, where the method includes the following operations.

In the operation S101, the primary chip obtains image data corresponding to an image to be displayed and transmitted. In one implementation, the primary chip may include a SOC.

In the primary chip SOC, OSD and video data are distributed at different layers, and they are separate and individual display data. The primary chip SOC mixes the OSD and video data, and merges the OSD and video data together, before the image data are transmitted.

The image may include a plurality of pixels. For example, the image may have a format of 1280×720. The image may have 1280 pixels in each rows and 720 pixels in each column. For each pixel of the image, the method may include determining, by the primary chip, whether the pixel type of the pixel is a menu OSD type or a video type. When the primary chip determines that that the pixel type of the pixel is the menu OSD type, the primary chip may label the pixel as a menu OSD pixel by setting a value of a flag bit of the pixel to be a first value. In one implementation, the first value may be 0. In another implementation, the first value may be 1. When the primary chip determines that that the pixel type of the pixel is the video type, the primary chip may label the pixel as a video pixel by setting a value of a flag bit of the pixel to be a second value. The second value may be different from the first value. Thus, in one implementation when the first value is 0, the second value may be 1; in another implementation when the first value is 1, the second value may be 0.

In the operation S102, the primary chip SOC transmits the image data corresponding to the image to be displayed, to a second chip. In one implementation, the second chip may include a Frame Rate Conversion (FRC) chip. The image data may include pixel data corresponding to the image to be displayed, and the pixel data may comprises information of a pixel type for indicating that a pixel in the image to be displayed is a menu OSD pixel or a video pixel. In another implementation, the pixel data may carry the pixel type. For example, the primary chip SOC transmits the image data carrying the pixel type to the FRC chip.

In some embodiments, the primary chip SOC transmitting the image data corresponding to the image to be displayed, to the FRC chip includes: the primary chip SOC packaging the image data corresponding to the image to be displayed according to the V-by-One protocol, and transmitting the packaged image data to the FRC chip.

All the pixel data in a frame of signal is transmitted according to V-by-One protocol instead of dividing the frame of signal into respective areas for transmitting.

In some embodiments, the pixel data carries the pixel type of the pixel for indicating the pixel in the image to be displayed is the menu OSD pixel or the video pixel. The pixel type for each pixel in the image to be displayed is represented by a flag bit, where the value of the flag bit indicates that the pixel in the image to be displayed is the menu OSD pixel or the video pixel.

In some embodiments, the flag bit is the $24^{th}$ bit or the $25^{th}$ bit in color data in the V-by-One protocol.

In some embodiments, the flag bit includes a first value and a second value, where the first value indicates that the pixel in the image to be displayed is the OSD pixel, and the second value indicates that the pixel in the image to be displayed is the video pixel.

The flag bit indicates that the pixel in the image to be displayed is the menu OSD pixel or the video pixel. For example, the primary chip SOC detects a pixel in the image to be displayed, and if the flag bit is set to 0, the pixel in the image to be displayed will be the OSD pixel; or if the flag bit is set to 1, the pixel in the image to be displayed will be the video pixel.

In another example, if the primary chip SOC detects pixels in a part of the areas in the image data as the OSD pixels, the $24^{th}$ or $25^{th}$ bit in color data of each pixel in the part of the areas is set to 0.

Figure 3:
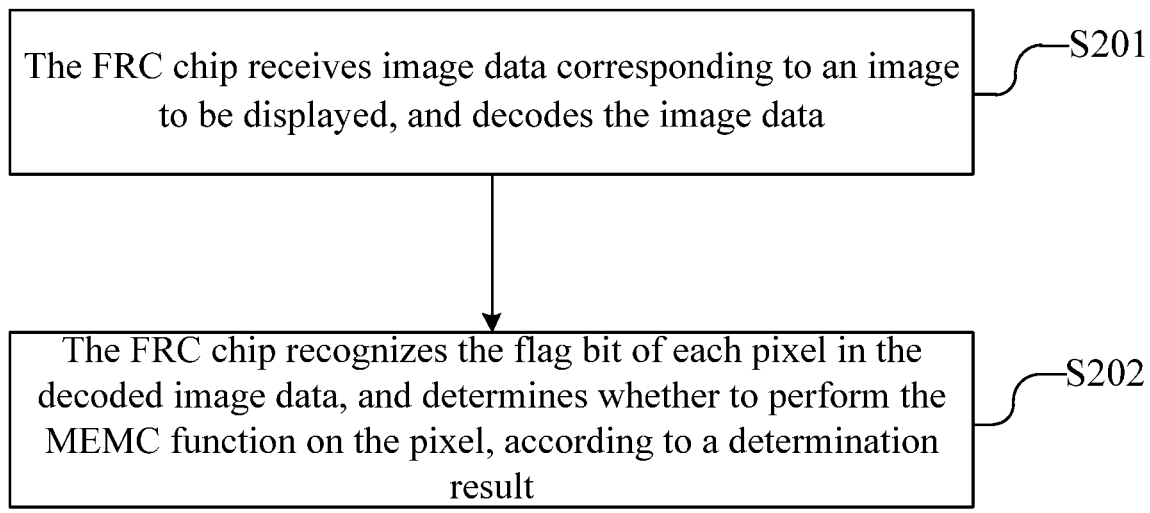
FIG. 3 is a flow chart of a method for recognizing image data according to some embodiments of the disclosure.

FIG. 3 is a flow chart of a method for identifying image data according to embodiments of the disclosure, where the method includes the following operations.

In the operation S201, the FRC chip receives image data corresponding to an image to be displayed, and decodes the image data.

In the operation S202, the FRC chip recognizes the flag bit of each pixel in the decoded image data, and determines whether to perform the Motion Estimation and Motion Compensation (MEMC) function on the pixel, according to a determination result.

In some embodiments, the FRC chip identifies the flag bit of each pixel in the decoded image data, and decides whether to perform the Motion Estimation and Motion Compensation (MEMC) function on the pixel, according to the determination result. In particular, said identifying and determining includes: the FRC chip determines for each pixel in the decoded image data whether the $24^{th}$ or $25^{th}$ bit in color data of the pixel is 1; and if so, the FRC chip will perform the MEMC function on the pixel; otherwise, the FRC chip will decide not to perform the MEMC function on the pixel.

Figure 4:
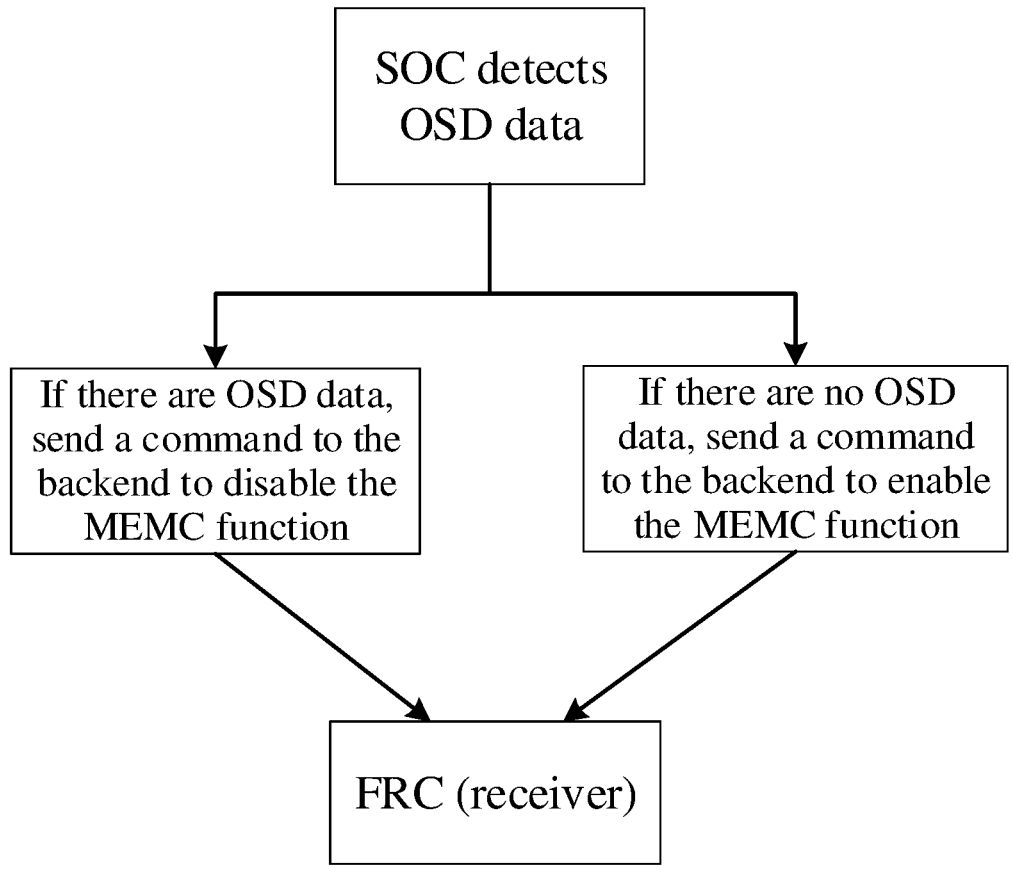
FIG. 4 is a schematic principle diagram of transmitting and recognizing image data according to some embodiments of the disclosure.

FIG. 4 is a schematic principle diagram of transmitting and identifying image data according to embodiments of the disclosure. The FRC chip enables or disables the MEMC function for a part of pixels in an image, but the primary chip SOC shall notify the FRC chip which pixel areas in the image are OSD pixels, and which pixel areas are video pixels. The primary chip SOC detects the pixels in the image data, and if they are OSD pixels, the primary chip SOC will send an instruction to the FRC chip of the receiver to disable the MEMC function; otherwise, the primary chip SOC will send another instruction to the FRC chip of the receiver to enable the MEMC function.

Figure 5:
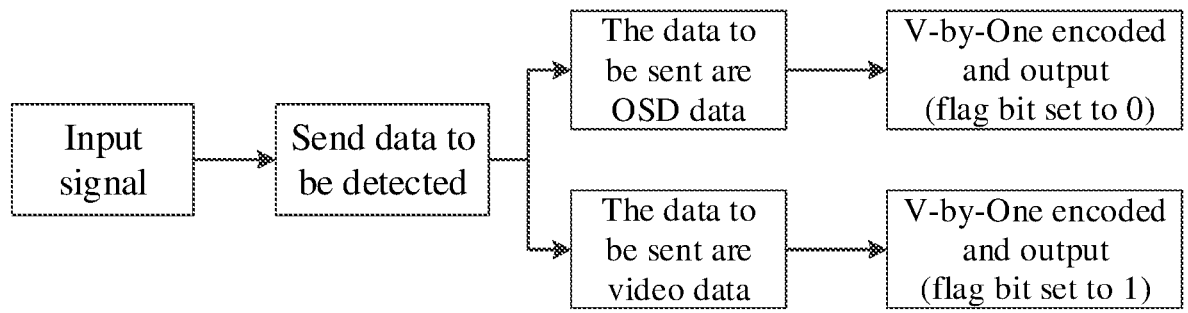
FIG. 5 is a schematic flow chart of a method for transmitting image data according to some embodiments of the disclosure.

FIG. 5 is a schematic flow chart of a method for transmitting image data according to embodiments of the disclosure. A signal is input to the primary chip SOC; and in the primary chip SOC, OSD and video data are distributed at different layer, and they are individual display data, so before the display data are transmitted, the primary chip SOC mixes the OSD and video data, merges the OSD and video data together, detects the OSD and video data, and if the data to be transmitted are OSD data, the primary chip SOC will set the $24^{th}$ or $25^{th}$ bit in color data in the V-by-One protocol to 0; or if the data to be transmitted are video data, the primary chip SOC will set the $24^{th}$ or $25^{th}$ bit in color data in the V-by-One protocol to 1.

Figure 6:
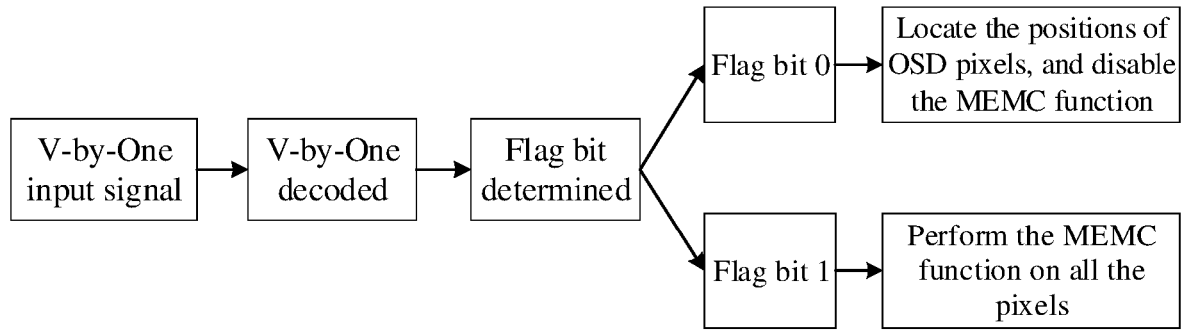
FIG. 6 is a flow chart of a method for recognizing image data according to some embodiments of the disclosure.

FIG. 6 is a schematic flow chart of a method for identifying image data according to embodiments of the disclosure. The FRC chip receives image data packaged according to the V-by-One protocol, and transmits and decodes the image data, and the FRC chip recognizes the $24^{th}$ or $25^{th}$ bit in color data of each pixel in the decoded image data. If the $24^{th}$ or $25^{th}$ bit in the color data is 0, the FRC chip will determine the pixel as an OSD pixel, and not perform the MEMC function on the pixel; or if the $24^{th}$ or $25^{th}$ bit in the color data is 1, the FRC chip will determine the pixel as a video pixel, and perform the MEMC function on the pixel.

Figure 7:
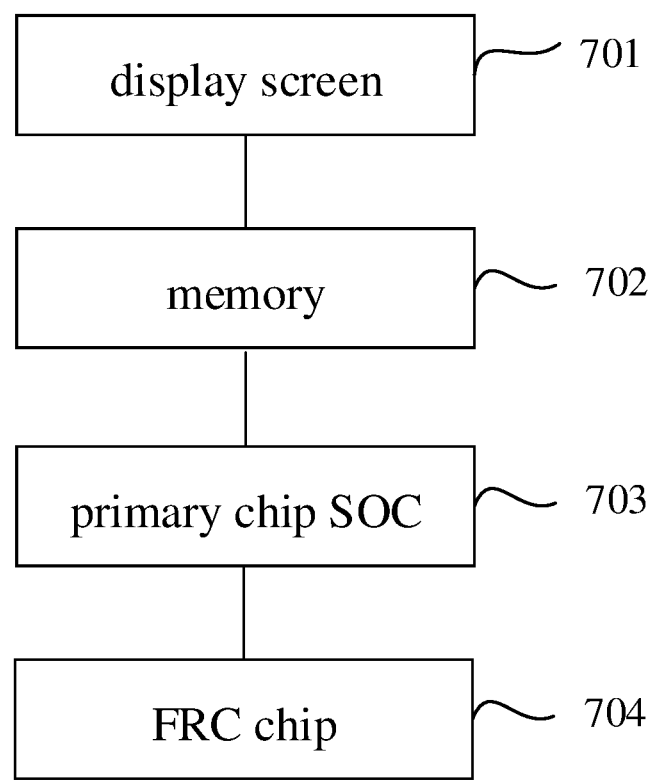
FIG. 7 is a schematic structural diagram of an intelligent TV according to some embodiments of the disclosure.

Referring to FIG. 7, the present disclosure describes an embodiment of a TV set. The TV set may include an intelligent TV set including a display screen, a memory, a first chip, and a second chip.

The display screen 701 is configured to display an image.

The memory 702 is configured to store instructions and data associated with the display screen 701, the first chip, and the second chip.

The first chip may be a primary chip, which may include a SOC 703. The first chip may include a first processor in communication with the memory 702, when the first processor executes the instructions stored inside the memory, the first processor is configured to cause the first chip to determine image data corresponding to the image to be displayed and transmitted, and to transmit the image data to the FRC chip, where the image data include pixel data corresponding to the image to be displayed, and the pixel data carries a pixel type for indicating whether a pixel in the image to be displayed is a menu OSD pixel or a video pixel.

The second chip may include a FRC chip 704. The second chip may include a second processor in communication with the first chip. When the second processor executes the instructions stored inside the memory, the second processor is configured to cause the second chip to receive the image data, to determine the pixel type of the pixel in the image data, perform the MEMC function on the pixel in the image to be displayed in response to the pixel type of the pixel being the video pixel, and not perform the MEMC function on the pixel in the image to be displayed in response to the pixel type of the pixel being the menu OSD pixel.

In some embodiments, the pixel type of the pixel is represented by a flag bit, and values of the flag bit are configured to indicate that the pixel in the image to be displayed is the menu OSD pixel or the video pixel.

In some embodiments, the flag bit comprises a first value and a second value, where the first value is configured to indicate that the pixel in the image to be displayed is the OSD pixel, and the second value is configured to indicate that the pixel in the image to be displayed is the video pixel.

For example, the primary chip SOC 703 detects each pixel in the image to be displayed, and if the flag bit of the pixel is set to 0, the pixel in the image to be displayed is determined as an OSD pixel; or if the flag bit of the pixel is set to 1, the pixel in the image to be displayed is determined as a video pixel.

In some embodiments, the primary chip SOC 703 is further configured to package the image data corresponding to the image to be displayed, according to the V-by-One protocol, and transmit the packaged image data to the FRC chip 704.

In some embodiments, the flag bit is a bit in color data according to the V-by-One protocol.

Embodiments of the disclosure provide a computer readable non-volatile storage medium storing computer program instructions configured to be executed by the intelligent TV set according to the above embodiments of the disclosure, where the computer program instructions comprise program configured to perform the method according to any one of the embodiments of the disclosure.

The computer storage medium can be any computer accessible available medium or data storage device including but not limited to a magnetic memory (e.g., a floppy disk, a hard disk, a magnetic tap, a Magnetic-Optical (MO) disk, etc.), an optical memory (e.g., a CD, a DVD, a BD, an HVD, etc.,), a semiconductor memory (e.g., an ROM, an EPROM, an EEPROM, a nonvolatile memory (NAND Flash), a Solid-State Disk (SSD)), etc.

Those skilled in the art shall appreciate that the embodiments of the disclosure can be embodied as a method, a system or a computer program product. Therefore the disclosure can be embodied in the form of an all-hardware embodiment, an all-software embodiment or Embodiments of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting image data of a TV set, the method comprising:
   transmitting, by a primary chip, image data to a second chip, wherein:
      the image data comprises pixel data associated with the image to be displayed, and
      the pixel data comprises a pixel type for indicating that a pixel in the image to be displayed is a menu On-Screen Display (OSD) pixel or a video pixel;
   receiving, by the second chip, the image data, and determining the pixel type of the pixel in the image data;
   performing, by the second chip, a Motion Estimate and Motion Compensation (MEMC) function on the pixel in the image to be displayed in response to the pixel type of the pixel being the video pixel, and not performing the MEMC function on the pixel in the image to be displayed in response to the pixel type of the pixel being the menu OSD pixel;
   wherein the pixel type of the pixel is indicated by a flag bit, and a first value of the flag bit is configured to indicate that the pixel in the image to be displayed is the menu OSD pixel, a second value of the flag bit is configured to indicate that the pixel in the image to be displayed is the video pixel; and
   wherein a flag bit of the pixel is a twenty-fourth or twenty-fifth bit in color data according to a V-by-One protocol.

2. The method according to claim 1, wherein:
   the primary chip comprises a system on chip (SOC); and
   the second chip comprises a Frame Rate Conversion (FRC) chip.

3. The method according to claim 1, further comprising:
   prior to transmitting the image data to the second chip, obtaining, by the primary chip, the image data associated with the image to be displayed and transmitted.

4. The method according to claim 1, wherein the transmitting, by the primary chip, the image data to the second chip comprises:

packaging, by the primary chip, the image data associated with the image to be displayed according to the V-by-One protocol, and transmitting, by the primary chip, the packaged image data to the second chip.

5. A TV set, comprising:

a display screen configured to display an image;

a memory configured to store instructions and data associated with the display screen;

a first chip, and a second chip;

the first chip, configured to determine image data associated with the image to be displayed and transmitted, and transmit image data to the second chip, wherein the image data comprises pixel data associated with the image to be displayed, and the pixel data comprises a pixel type for indicating a pixel in the image to be displayed is a menu On-Screen Display (OSD) pixel or a video pixel;

the second chip, configured to receive the image data, determine the pixel type of the pixel in the image data, perform a Motion Estimate and Motion Compensation (MEMC) function on the pixel in the image to be displayed in response to the pixel type of the pixel being the video pixel, and not perform the MEMC function on the pixel in the image to be displayed in response to the pixel type of the pixel being the menu OSD pixel;

wherein the pixel type of the pixel is indicated by a flag bit, and a first value of the flag bit is configured to indicate that the pixel in the image to be displayed is the menu OSD pixel, a second value of the flag bit is configured to indicate that the pixel in the image to be displayed is the video pixel; and wherein a flag bit of the pixel is a twenty-fourth or twenty-fifth bit in color data according to a V-by-One protocol.

6. The TV set according to claim 5, wherein:

the first chip comprises a system on chip (SOC); and the second chip comprises a Frame Rate Conversion (FRC) chip.

7. The TV set according to claim 5, wherein the first chip is further configured to package the image data associated with the image to be displayed according to the V-by-One protocol, and transmit the packaged image data to the second chip.

* * * * *